(12) United States Patent
Shaaban et al.

(10) Patent No.: US 11,620,618 B2
(45) Date of Patent: Apr. 4, 2023

(54) DIGITAL ASSISTANT FOR COMPLETION OF TIMECARDS

(71) Applicant: Fulcrum Global Technologies Inc., Chicago, IL (US)

(72) Inventors: Ahmed Farouk Shaaban, South Barrington, IL (US); Venkat Thandra, South Barrington, IL (US)

(73) Assignee: FULCRUM GLOBAL TECHNOLOGIES INC., Chicago, IL (US)

( * ) Notice: Subject to any disclaimer, the term of this patent is extended or adjusted under 35 U.S.C. 154(b) by 128 days.

(21) Appl. No.: 16/917,761

(22) Filed: Jun. 30, 2020

(65) Prior Publication Data

US 2021/0012290 A1    Jan. 14, 2021

Related U.S. Application Data

(60) Provisional application No. 62/886,335, filed on Aug. 13, 2019, provisional application No. 62/873,823, filed on Jul. 12, 2019.

(51) Int. Cl.
    *G06F 3/0481*      (2022.01)
    *G06Q 10/1091*    (2023.01)

(52) U.S. Cl.
    CPC ....... *G06Q 10/1091* (2013.01); *G06F 3/0481* (2013.01)

(58) Field of Classification Search
    CPC .......................... G06Q 10/1091; G06F 3/0481
    See application file for complete search history.

(56) References Cited

U.S. PATENT DOCUMENTS

| | | | |
|---|---|---|---|
| 8,219,115 B1 * | 7/2012 | Nelissen | G06F 9/54 455/418 |
| 8,391,835 B1 * | 3/2013 | Lubart | G06Q 10/1091 455/406 |
| 2002/0069145 A1 * | 6/2002 | Collado | G06Q 10/06314 705/32 |
| 2003/0097361 A1 * | 5/2003 | Huang | H04L 51/14 |
| 2006/0047548 A1 * | 3/2006 | Ulmer | G06Q 10/10 715/226 |
| 2007/0050710 A1 * | 3/2007 | Redekop | G06F 16/9577 715/210 |
| 2008/0034315 A1 * | 2/2008 | Langoulant | G06Q 10/107 715/780 |
| 2009/0232289 A1 * | 9/2009 | Drucker | G06Q 30/0284 379/114.03 |
| 2009/0234761 A1 * | 9/2009 | Taylor | G06Q 40/02 705/32 |
| 2009/0234780 A1 * | 9/2009 | Drucker | G06Q 30/0283 705/418 |

(Continued)

*Primary Examiner* — Tuyetlien T Tran
(74) *Attorney, Agent, or Firm* — Global IP Counselors, LLP

(57) ABSTRACT

A method of time entry on a graphical user interface (GUI) of a computer system includes receiving via the GUI information related to an event, determining, by an electronic controller, that the event has occurred, determining, by the electronic controller, that the event relates to a name in a contact list stored in a storage device of the computer system, and arranging on the GUI a time entry interface to prompt a user to enter information related to a matter.

26 Claims, 9 Drawing Sheets

(56) References Cited

U.S. PATENT DOCUMENTS

| | | | | |
|---|---|---|---|---|
| 2010/0030605 A1* | 2/2010 | Cargille | ............... | G06Q 10/10 |
| | | | | 705/7.15 |
| 2010/0100463 A1* | 4/2010 | Molotsi | ............. | G06Q 10/1091 |
| | | | | 705/32 |
| 2011/0153477 A1* | 6/2011 | Niazi | ............... | G06Q 10/1091 |
| | | | | 705/32 |
| 2013/0239016 A1* | 9/2013 | Adams | ............. | H04M 1/72451 |
| | | | | 715/752 |
| 2014/0006343 A1* | 1/2014 | Allison | ............... | G06Q 10/107 |
| | | | | 707/609 |
| 2014/0258057 A1* | 9/2014 | Chen | ................. | G06Q 10/105 |
| | | | | 705/32 |
| 2014/0372262 A1* | 12/2014 | Young | ................. | G06Q 40/12 |
| | | | | 705/30 |
| 2015/0081486 A1* | 3/2015 | Niazi | ............... | G06Q 10/1091 |
| | | | | 705/32 |
| 2015/0248732 A1* | 9/2015 | Young | ................. | G06F 40/174 |
| | | | | 705/30 |
| 2015/0302531 A1* | 10/2015 | Thier | ................. | G06Q 40/10 |
| | | | | 705/30 |
| 2016/0034987 A1* | 2/2016 | Shaaban | ............... | G09C 1/00 |
| | | | | 705/31 |
| 2017/0169520 A1* | 6/2017 | Cornet | ............... | G06Q 40/125 |
| 2018/0252567 A1* | 9/2018 | Buteau | ............... | G01M 15/044 |
| 2018/0322468 A1* | 11/2018 | Bansal | ............... | G06Q 10/1091 |
| 2018/0330332 A1* | 11/2018 | Patel | ............... | G06Q 10/1091 |
| 2018/0357609 A1* | 12/2018 | Hwacinski | ......... | G06F 3/04817 |
| 2021/0149899 A1* | 5/2021 | Gutierrez | ............ | G06F 16/252 |

* cited by examiner

DIGITAL ASSISTANT FOR COMPLETION OF TIMECARDS

CROSS-REFERENCE TO RELATED APPLICATION

This application claims benefit of U.S. Provisional Application No. 62/873,823 filed Jul. 12, 2019 and U.S. Provisional Application No. 62/886,335 filed Aug. 13, 2019, the contents of each of which are hereby incorporated herein by reference.

BACKGROUND

Field of the Invention

The instant disclosure relates generally to time billing systems and, in particular, to a digital assistant for the completion of timecards based on an event.

Background of the Invention

Time billing systems for use in professional service businesses (e.g., law firms, business consultants, medical practices, etc.) are well known in the art. In such professional services businesses, fees for work performed are often time-based, e.g., billed to professional service clients on an hourly basis. The process of recording time spent by individual service providers (e.g., attorneys, consultants, etc.) into a time billing system is often referred to as time entry, with individual records being referred to as timecards. For example, in a single day, it is not uncommon for a timekeeper to work on multiple different matters and create timecards for each matter worked on that day. Typically, a timecard will include information identifying a particular client for whom work has been performed, a specific matter worked on for that client, the amount of time spent on that matter for this timecard, a narrative describing the nature of the work performed and, optionally, one or more standardized (or customized) codes used to further categorize the work performed.

SUMMARY

There are numerous computer-based accounting and time entry tools currently available on the market. It has been discovered that, even with the availability of such tools and the features they offer, time entry for hours-based billable work can be a tedious task because time entry requires users to manually enter data. Moreover, a further complication of existing systems is that it relies on users to be diligent in recording the time spent on billable work. If a timekeeper delays capturing a record of services performed in a relatively short time after performing the service, there is an increased likelihood that the service will be mis-recorded or not at all, and that the narratives describing the services performed are more likely to be insufficient.

Thus, it would be advantageous to provide tools that address these shortcoming of prior art time billing systems. In view of the state of the known technology, one aspect of the present disclosure is to provide a method of time entry on a graphical user interface (GUI) of a computer system includes receiving via the GUI information related to an event, determining, by an electronic controller, that the event has occurred, determining, by the electronic controller, that the event relates to a name in a contact list stored in a storage device of the computer system, and arranging on the GUI a time entry interface to prompt a user to enter information related to a matter.

In a second aspect of the embodiment of the present method related to the first aspect, based on the name in the contact list, a matter interface to prompt the user to enter information related to the matter is arranged on the GUI a matter interface to prompt the user to enter information related to the matter.

In a third aspect of the embodiment of the present method related to the first aspect, the matter is one of a plurality of matters, and the matter interface including the plurality of matters for selection of the matter by the user is arranged on the GUI.

In a fourth aspect of the embodiment of the present method related to the first aspect, based on the name in the contact, the electronic controller determines the matter.

In a fifth aspect of the embodiment of the present method related to the first aspect, a timecard interface based on the matter is arranged on the GUI.

In a sixth aspect of the embodiment of the present method related to the first aspect, a timecard interface based on the calendar event is generated by the electronic controller.

In a seventh aspect of the embodiment of the present method related to the first aspect, the event is one of a calendar event and a GPS event.

In a eighth aspect of the invention a method of time entry on a graphical user interface (GUI) of a computer system is provided. The method includes receiving via the GUI information related to a calendar event, determining, by an electronic controller, whether the calendar event has occurred, determining, by the electronic controller, that the calendar event relates to a plurality of names in a contact list stored in a storage device of the computer system, arranging on the GUI a names interface to prompt a user to select a name, based on the name selected, determine, via the electronic controller, a matter, and arranging on the GUI a time entry interface to prompt a user to enter information related to the matter.

In an ninth aspect of the embodiment of the present method related to the eighth aspect, based on the name selected, a matter interface to prompt the user to enter information related to the matter is arranged on the GUI.

In a tenth aspect of the embodiment of the present method related to the eighth aspect, the matter is one of a plurality of matters, and the matter interface being arranged on the GUI includes arranging the plurality of matters for selection of the matter by the user.

In an eleventh aspect of the embodiment of the present method related to the eighth aspect, a timecard interface based on the matter is arranged on the GUI.

In a twelfth aspect of the embodiment of the present method related to the eighth aspect, a timecard interface based on the calendar event is generated by the electronic controller.

In a thirteenth aspect of the embodiment of the present method related to the eighth aspect, the event is one of a calendar event and a GPS event.

In a fourteenth aspect of the present disclosure a computer system for time entry is provided. The computer system comprises a graphical user interface (GUI) and an electronic controller. The GUI is configured to receive information related to a calendar event. The electronic controller is configured to determine that the calendar event has occurred, that the calendar event relates to a name in a contact list stored in a storage device of the computer system, and to arrange on the GUI a time entry interface to prompt a user to enter information related to a matter.

In a fifteenth aspect of the embodiment of the present system related to the fourteenth aspect, based on the name in the contact list, the electronic controller is configured to arrange on the GUI a matter interface to prompt the user to enter information related to the matter.

In a sixteenth aspect of the embodiment of the present system related to the fourteenth aspect, the matter is one of a plurality of matters, and the electronic controller is configured to arrange on the GUI the matter interface including the plurality of matters for selection of the matter by the user.

In a seventeenth aspect of the embodiment of the present system related to the fourteenth aspect, based on the name in the contact, the electronic controller is configured to determine the matter.

In an eighteenth aspect of the embodiment of the present system related to the fourteenth aspect, the electronic controller is configured to arrange on the GUI a timecard interface based on the matter.

In a nineteenth aspect of the embodiment of the present system related to the fourteenth aspect, the electronic controller is configured to generate a timecard interface based on the calendar event.

In a twentieth aspect of the embodiment of the present method related to the fourteenth aspect, the event is one of a calendar event and a GPS event.

Embodiments of the present invention improve collection and recordation of time entry information and id effective at improving the accuracy of the time entry data based on knowledge about the user's calendar and thereafter engage in a question-and-answer dialog with the user to elicit information necessary to generate a timecard.

BRIEF DESCRIPTION OF THE DRAWINGS

Referring now to the attached drawings which form a part of this original disclosure.

DETAILED DESCRIPTION OF THE EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
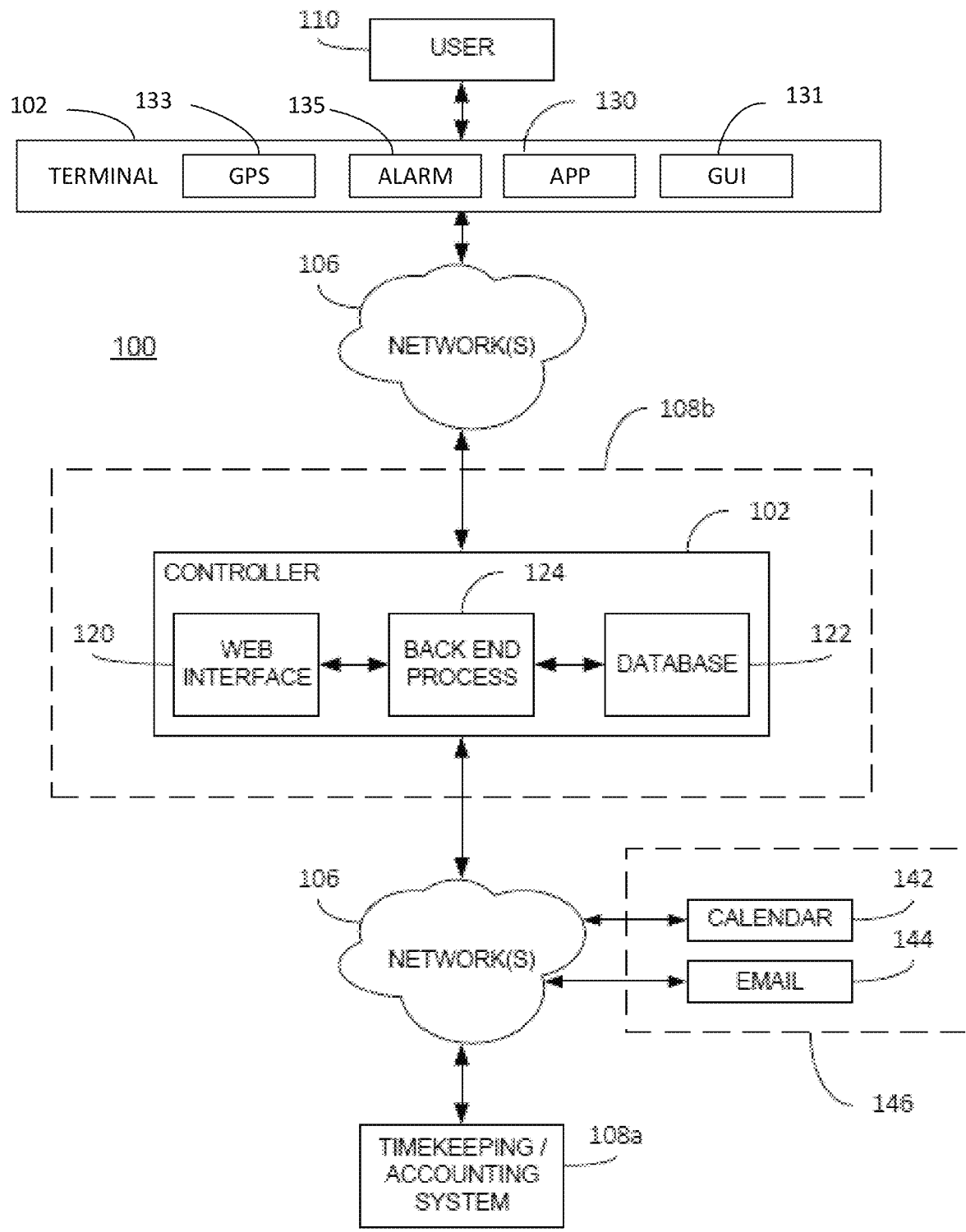
FIG. 1 is a schematic diagram of a system in accordance with an embodiment of the present disclosure.

Referring initially to FIG. 1, a system 100 in accordance with an embodiment of the present invention is illustrated. Specifically, the system 100 comprises an electronic controller 102 in communication with a plurality of terminals 104 (only one shown for ease of illustration) via one or more intervening networks 106. As described in greater detail below, the controller 102 can include one or more server computers, database servers or other types of computing devices as known in the art, particularly in connection with, for example, the implementation of websites and/or enterprise software. Similarly, the terminal(s) 104 can include processing devices for individual users or small groups of individual users 110, such as desktop computers, laptop computers or the like. Alternatively, the terminal(s) 104 can include mobile computing devices such as handheld computers, mobile telephones and the like. Although a single terminal 104 and user 110 is illustrated in FIG. 1, it is understood that a any number of terminals and users can be accommodated in the system of FIG. 1, either individually or in simultaneously in parallel.

Regardless of their form, the terminals 104 or other computing devices used to communicate with the controller can employ known communication protocols (e.g., the Internet Protocol Suite or TCP/IP supporting HTTP) for this purpose. The network(s) 106 can comprise a public network (e.g., the Internet, World Wide Web, etc.) or private network (e.g., local area network (LAN), etc.) or combinations thereof (e.g., a virtual private network, LAN connected to the Internet, etc.). Furthermore, the network 106 need not be a wired network only, and can comprise wireless network elements as known in the art. As described in further detail below, the controller 102 facilitates timecard creation via the terminal 104 associated with a given user (timekeeper) 110.

The user 110 can be an individual person or relatively small group of persons (e.g., a timekeeper and assistant) tasked with creating timecards for work performed. As shown, the system 100 can also comprise calendar and email programs 142, 144. As known in the art, each user 110 can access such calendar and email programs 142, 144 via a corresponding terminal 104 and the network(s) 106. For example, each terminal 104 can implement a calendar and/or email that communicates with corresponding calendar and/ or email servers. A number of well-known calendar and email programs are available for this purpose, e.g., Outlook, Apple Mail or Gmail for email programs and Outlook or Google Calendar for calendar programs. Although the calendar and email programs 142, 144 can be separate, in an embodiment, the calendar and email programs 142, 144 can be integrated into a single program 146, as in the case of Outlook, accessible via know application protocol interfaces (APIs).

FIG. 1 also illustrates a timekeeping/accounting system 108 that can be provided in two forms. Specifically, a remote timekeeping/accounting system 108*a* can be provided that is accessible by the controller 102 via the network(s) 106. This can be the case, for example, where the digital assistant described herein and implemented by the controller 102 exists in standalone fashion relative to the remote timekeeping/accounting system 108*a*. This can be a desirable implementation in those instances in which a professional organization has an existing timekeeping/accounting system 108*a*. In this case, the controller 102 can interact with the remote timekeeping/accounting system 108*a* via suitable APIs provide by the remote timekeeping/accounting system 108*a*. Alternatively, the controller 102 implementing the herein described digital assistant can be integrated into a unified timekeeping/accounting system 108*b*. Examples of such timekeeping/accounting systems 108 include EPOCH by Fulcrum Global Technologies Inc., Time by Intapp, Inc. or Elite 3E by Thomson Reuters.

In the illustrated embodiment, the controller 102 can comprise a web interface 120, a database 122 and, a back end process 124 as shown in FIG. 1. As known in the art, the web interface 120, database 122 and back end process 124 can be implemented by one or more server computers implementing appropriate software programs known to those of skill in the art. The web interface 120 operates to provide a graphical user interface (GUI) 131 that can be displayed on a terminal 104 and used to prompt users 110 for timecard data as described in further detail below. Techniques for implementing such graphical user interfaces are well known to those of skill in the art. In an alternative embodiment, a terminal 104 can include an application 130 comprising software that is downloaded to and executed by the terminal to provide the graphical user interface and to manage communications with the controller 102. In this embodiment, the application 130 can be downloaded to the terminal 104 from the controller 102 or from some other source such as an application distribution platform, e.g., the so-called App Store provided by Apple Inc. or the Google Play site provided by Google LLC.

The database 122 stores all data relevant to each user's timecards, user's credentials, user's email/calendar information (e.g., emails, calendar events, subscriptions to emails and calendar events) and any supporting data needed to complete timecards (e.g., lists of clients, lists of matters for each client, lists of tasks that can be selected for a given client, lists of activities that can be selected for a given task for a given client, identification of any fixed fee task for a given client, etc.). In an embodiment, the database 122 can comprise a database management system (DBMS) operating on one or more suitable database server computers, as known in the art. Alternatively, the database 122 can comprise storage components from other systems, such as an existing timekeeping tool having relevant data concerning the users 110 already stored therein.

Finally, the back end process 124 is operatively coupled to both the web interface 120 and the database 122 in the illustrated embodiment. The back end process 124, which can be implemented by a suitably programmed computing device such as a server computer, directs operations of the controller 102, as described below in further detail. For example, the back end process 124 manages the receipt, storage, maintenance, etc. of relevant data (received from the user 110 via terminal 104) concerning the user's timecards. Additionally, in an embodiment, the back end process 124 communicates with each user's calendar and email programs 142, 144, as described in further detail below.

Figure 2:
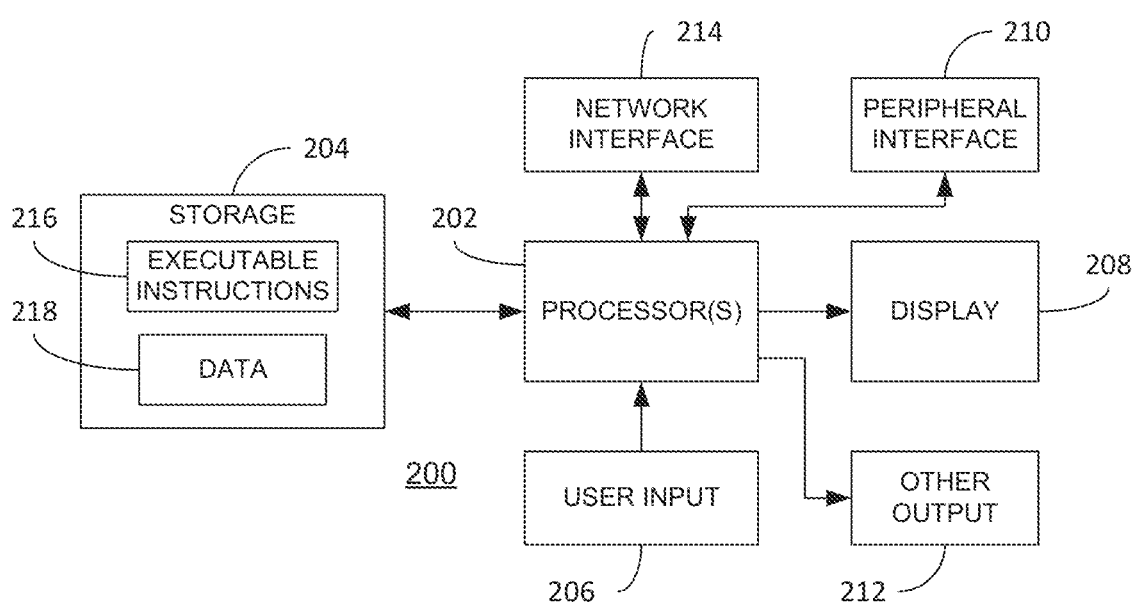
FIG. 2 is a schematic diagram of a processing device that can be used to implement various aspects of the embodiment of FIG. 1.

Referring now to FIG. 2, a representative processing device 200 that can be used to implement the teachings of the instant disclosure is illustrated. The device 200 can be used to implement, for example, the various processing or computing devices noted concerning the controller 102 and terminals 104. The processor 200 itself is also an example of an electronic controller or electronic processer. Regardless, the device 200 comprises an electronic processor 202 coupled to a storage component 204. The storage component 204, in turn, comprises stored executable instructions 216 and data 218. In an embodiment, the processor 202 can comprise one or more of a microprocessor, microcontroller, digital signal processor, co-processor or the like or combinations thereof capable of executing the stored instructions 216 and operating upon the stored data 218. Likewise, the storage component 204 can comprise one or more devices such as volatile or nonvolatile memory including but not limited to random access memory (RAM) or read only memory (ROM). Further still, the storage component 204 can be embodied in a variety of forms, such as a hard drive, optical disc drive, floppy disc drive, etc. Processor and storage arrangements of the types illustrated in FIG. 2 are well known to those having ordinary skill in the art. In one embodiment, the processing techniques described herein are implemented as a combination of executable instructions and data within the storage component 204.

As shown, the device 200 can comprise one or more user input devices 206, a display 208, a peripheral interface 210, other output devices 212 and a network interface 214 in communication with the processor 202. The user input device 206 can comprise any mechanism for providing user input (such as, for example, inputs specifying products history data, etc.) to the processor 202. For example, the user input device 206 can comprise a keyboard, a mouse, a touch screen, microphone and suitable voice recognition application or any other means whereby a user of the device 200 can provide input data to the processor 202. The display 208, can comprise any conventional display mechanism such as a cathode ray tube (CRT), flat panel display, or any other display mechanism known to those having ordinary skill in the art. Thus, as can be understood, the user input device and/or the display and/or any other suitable element can be considered a GUI. The peripheral interface 210 can include the hardware, firmware and/or software necessary for communication with various peripheral devices, such as media drives (e.g., magnetic disk or optical disk drives), other processing devices or any other input source used in connection with the instant techniques. Likewise, the other output device(s) 212 can optionally comprise similar media drive mechanisms, other processing devices or other output destinations capable of providing information to a user of the device 200, such as speakers, LEDs, tactile outputs, etc. Finally, the network interface 214 can comprise hardware, firmware and/or software that allows the processor 202 to communicate with other devices via wired or wireless networks, whether local or wide area, private or public, as known in the art. For example, such networks can include the World Wide Web or Internet, or private enterprise networks, as known in the art.

While the device 200 has been described as one form for implementing the techniques described herein, those having ordinary skill in the art will appreciate that other, functionally equivalent techniques can be employed. For example, as known in the art, some or all of the functionality implemented via executable instructions can also be implemented using firmware and/or hardware devices such as application specific integrated circuits (ASICs), programmable logic arrays, state machines, etc. Furthermore, other implementations of the device 200 can include a greater or lesser number of components than those illustrated. Once again, those of ordinary skill in the art will appreciate the wide number of variations that can be used is this manner. Further still, although a single processing device 200 is illustrated in FIG. 2, it is understood that a combination of such processing devices can be configured to operate in conjunction (for example, using known networking techniques) to implement the teachings of the instant disclosure.

Figure 3:
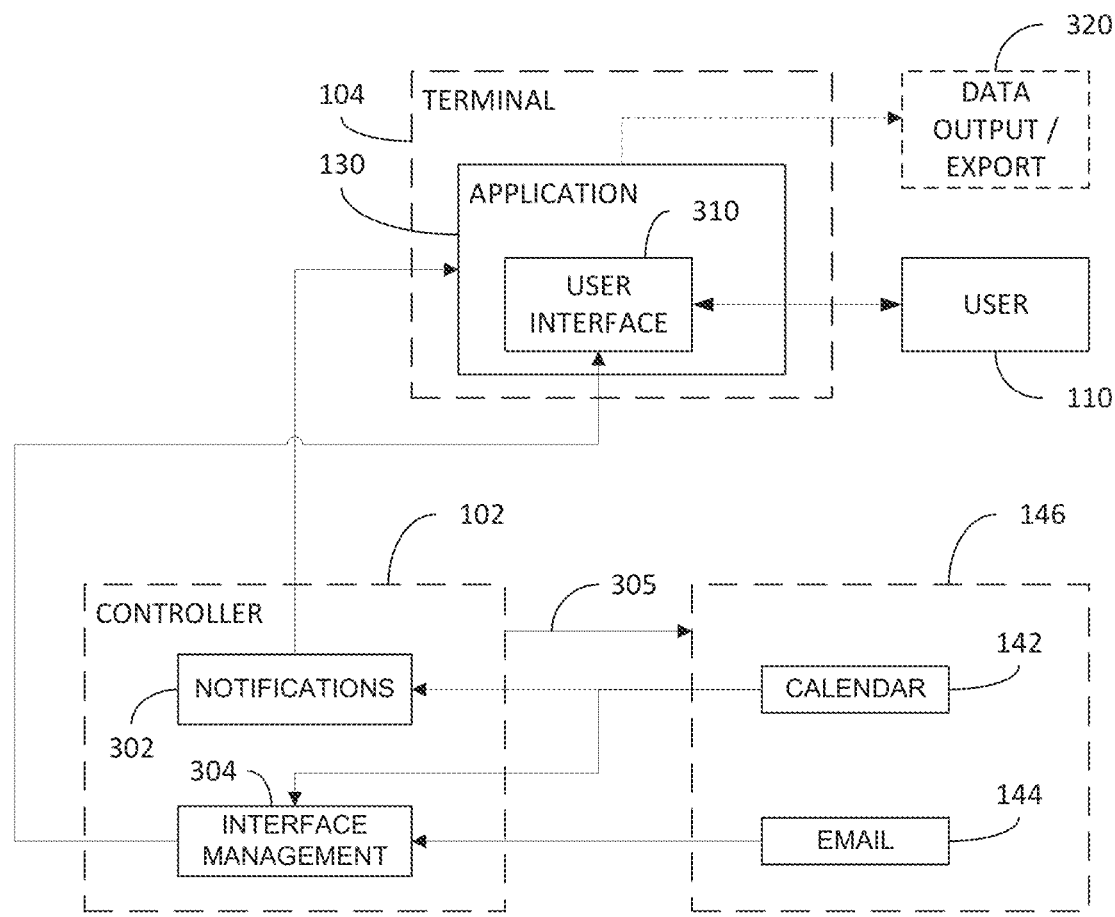
FIG. 3 is a functional schematic diagram illustrating structure for implementing and interacting with the digital assistant in accordance with the embodiment of FIG. 1.

In an embodiment, the system 100 illustrated in FIG. 1 can function as a digital assistant to aid in the capture of timecard data. FIG. 3 illustrates a functional block diagram of an architecture for implementing and interacting with a digital assistant. In this embodiment, the controller 102 implements a notification module 302 and an interface management module 304. As described in further detail below, the notification module 302 operates to provide notifications to the user 110 (via the user's terminal 104) of various events related to timecard creation. In this operation, the notification module 302 can obtain information from the user's calendar program 142. However, the event is not limited to a calendar event, and can be any suitable event, for example, a GPS location event or an alarm. That is, the terminal 104 through the Global Position System (GPS) 133 or the alarm 135 can notify the controller 102 that an event has occurred and the controller 102 can determine that a relevant has occurred. For example, the GPS 133 can notify the controller 102 that the user 110 is at, is traveling to, or is traveling from a client, or other location (court, or other known location) and determine that a billable event may have occurred.

The interface management module 304 serves as the intelligence behind the digital assistant to the extent that it controls operation of user interfaces that implement a "chat bot"-type functionality that elicits information for the creation of timecards from the user 110. Additionally, in implementing the chat bot function, the interface management module 304 operates to obtain information from both the user's calendar and email programs 142, 144. As schematically illustrated by an arrow 305, the controller can access one or more APIs provided by the calendar and email programs 142-146 to request access to the relevant calendar and email data. Furthermore, the application 130 operating on the user's terminal 104 operates to implement a user interface 310, various examples of which are illustrated with reference to FIGS. 5-11 below.

As noted above, the digital assistant can operate in a standalone mode or be integrated into a timekeeping/accounting system. In the former case, it is necessary to provide a data output/export 320 so that timecard data can be provided to the timekeeping/accounting system. To this end, in an embodiment, the data output/export 320 can comprise one or more comma separated values (CSV) files, though it is appreciated that other output formats can be equally employed.

Figure 4:
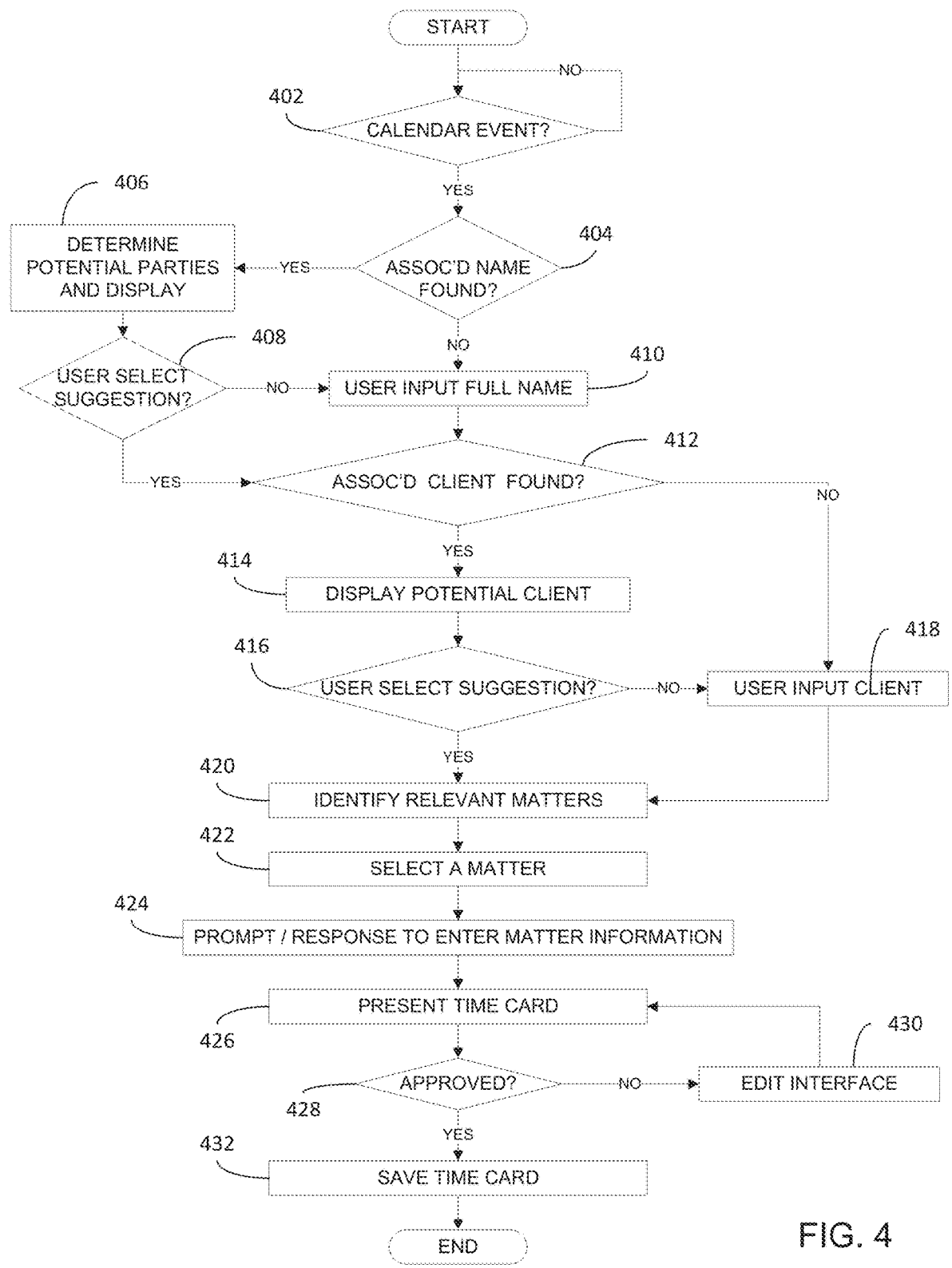
FIG. 4 is a flow chart illustrating further processing in accordance with the embodiment of FIG. 1.

Referring now to FIG. 4, processing in accordance with the instant disclosure is further described. In particular, the processing illustrated in FIG. 4 can be carried out by the controller 102 in cooperation with the application 130. Beginning at block 402, a determination is continuously performed whether any event has occurred in the user's calendar, email GPS, alarm of any other system. In one embodiment, users can set schedules concerning when the controller 102 and contact the user, e.g., daily at certain times. Further still, the specific times the controller 102 contacts the user can be based on the user's location.

With reference to FIG. 3, and as known in the art, the controller 102 is granted access to a user's calendar and email information using, for example, the OAuth standard. Once such access has been set up, the controller 102, via the notifications module 302, inspects the user's calendar program 142, to identify any calendar events that have recently expired (in the form of a JSON body returned by the calendar program 142). For example, on a given day, a user's calendar can have an event "Lunch with John" from noon to 1 pm. Based on this, the notification module 302 knows that, at 1 pm on that day, the user has likely completed the scheduled event, i.e., lunch with an entity known as "John."

If event is detected at block 402, processing continues at block 404 where it is determined whether there is any person named in the identified calendar event or the known location. If not (as in the case, for example, of a calendar event that states only "Client meeting"), then processing continues at block 410 where the user is asked, via the interface module 304 and user interface 310, to provide information identifying a particular client (if any) associated with the event. That is, the controller can present or arrange an icon, drop down menu or other visual indicator on the GUI that requests information to be provided identifying a particular client (if any) associated with the event. Thereafter, at block 412, the name provided by the user at block 410 is compared with a mapping of individual names to particular clients. By locating the provided name in this list, a client can be identified.

Alternatively, if the event did include information identifying an entity (e.g., a calander event that included "Lunch with John"), processing continues from block 404 to block 406 where an analysis is performed, based on the named entity, to determine potential clients that can be associated with the named entity. For example, in an embodiment, where at least a person's first name is provided in the calendar event data, the interface management module 304 operates under the assumption that the user 110 is likely to have referred to this person in the same manner in the user's emails. Consequently, the user's emails are analyzed to determine any likely candidates as to who the named person actually is. For example, where the calendar event refers to "Lunch with John", the last X days of the user's email are analyzed to search for any references to an email sender/receiver named "John." In an embodiment, the default value of X is 30. According to an embodiment, a search of the user's emails is based on the assumption that however you can refer to a certain individual in a calendar entry is likely also the same way the user would likely refer to that same person in his/her emails. Thus, for a given entity name, the user's emails are searched for references to the entity name. For example, assume the user in the example above has sent emails to a "John Adams," "John Bell" and " John Cooper" in the last X days. Further assume that the user typically refers to these individuals as "J," "John" and "Cooper," respectively. In this case the frequency of usage for the name "John" (as normalized over the total number of emails in the last X days) would most likely be highest for John Bell, who would then be presented as the top suggestion as the individual referred to in the "Lunch with John" calendar entry. As another example, if the user were to instead refer to John Cooper as both "John" and "Cooper" with equal likelihood, then the normalized frequency of usage for John Cooper would still have less likelihood of being referred to as "John" than John Bell, but would still have some likelihood, nonetheless. Thus, in this example, John Bell would still be presented as the first or topmost suggestion, but John Cooper would also be provided as a second suggestion. Accordingly, in one embodiment, the controller uses an algorithm to determine the most likely candidate as the potential client. By automatically searching the email database, or any other database, the process is significantly speed up and improved.

Regardless, the potential candidates identified in this manner are then presented to the user as suggestions via the user interface 310. That is, the controller can present or arrange an icon, drop down menu or other visual indicator on the GUI that requests information to be provided identifying a particular client (if any) associated with the event. If the user opts not to select any of the provided suggestions, processing continues at block 410 where the user is once again requested to input a name, which is thereafter used at block 412 to identify a corresponding client. Otherwise, where the user picks one of the suggested names, the select name is used at block 412 to identify the corresponding client.

As noted above, the client identification at block 412 can be performed through a lookup table mapping individual names to specific clients, which mappings could be maintained at a firm-wide level and/or at an individual user level. If no such client is identified, processing can continue at block 418 where the user is prompted to directly enter a client's name. Processing then continues at block 420 where all potential matters for the provided client are identified and presented to the user 110 via the user interface 310. Once again, a mapping between each client and their respective matters can be used for this purpose.

On the other hand, if one or more potential clients are identified at block 412, the potential clients are presented for display to the user 110 at block 414. Multiple potential clients can be identified where ambiguities arise based on the name are determined, e.g., a "John Smith" can be associated with "Client X," whereas another "John Smith" associated with "Client Y" can also exist. Thereafter, processing continues at block 416 where it is determined if the user 110 has made a selection from among the presented candidates. If the user selects one of the suggested clients, processing proceeds to block 420 where, as described above, all potential matters for the selected client are identified and presented to the user via the user interface 310. If no selection is made, processing continues at block 418 as described above.

Once the available matters for a particular client have been presented, processing continues at block 422 where the user selects a specific matter for the client. At this point, it now becomes possible to create a timecard for the selected client and matter. Thus, processing continues at block 424 where a series of prompts are provided to the user 110, where the answers to each prompt provide additional data for the completion of the timecard. Generally, at a minimum, each timecard will include information identifying a particular client and matter, the time spent performing the relevant work and a textual narrative concerning the work performed. Because the system already knows the specific client and mater, as well at least an initial estimate of the time spent on the particular matter (as determined according to the length of the event retrieved from the user's calendar), the user is minimally asked, at block 414, to provide a textual narrative of the work performed corresponding to the calendar event that initiated creation of the timecard. Further information can also be elicited from the user at block 424.

For example, in an embodiment, it is known in the art that time entries for certain matters must be "coded" with information that further categorizes the time entry. For example, the American Bar Association has published the Uniform Task-Based Management System (UBTMS) code set, which sets forth categories of potential codes for different types of legal representation. For instance, under the broad category of "Litigation," the UBTMS sets for various distinct phases, i.e., "Case Assessment, Development and Administration;" "Pre-Trial Pleadings and Motions;" "Discovery;" "Trial Preparation and Trial" and "Appeal." Within each of these phase categories, various tasks are further defined. For example, within the "Discovery" phase, the UBTMS defines the following task codes: L310 Written Discovery, L320 Document Production, L330 Depositions, L340 Expert Discovery, L350 Discovery Motions and L390 Other Discovery. Additionally, for any given phase and task, the UBTMS also provides various activity codes to further characterize the specific nature of the time worked, e.g.: A101 Plan and prepare for, A102 Research, A103 Draft/revise, A104 Review/analyze, A105 Communicate (in firm), A106 Communicate (with client), A107 Communicate (other outside counsel), A108 Communicate (other external), A109 Appear for/attend, A110 Manage data/files, A111 Other. Additionally, it is known for businesses to create their own codes for administrative purposes. Based on such coding systems, processing at block 424 can also include asking the user about the specific phase, task and activity for a given time entry, with the user's responses to each query further defining the particular code(s) to be included in the timecard.

Regardless, once the required information for completing a timecard for the identified client/matter has been obtained, processing continues at block 426 where the user is presented, via the interface 310, with a draft of the timecard based on the obtained information. In other words, the controller analyzes the information regarding the coding system and/or the information added by the user, generates a draft timecard based on the information and, then the controller arranges on the GUI a draft timecard. Then, at block 428, the user 110 is permitted to either approve the draft timecard as-is or to further edit the timecard. If the draft timecard is approved, processing can proceed at block 432, where the timecard is saved, e.g., within the database 122. Alternatively, if the user elects to further edit the timecard, processing continues at block 430 where the user is presented with an editing interface that permits the user to change information in the draft timecard. For example, even though a given calendar event can have had a duration of a single hour set forth for a given meeting, the user can desire to alter the time worked if he/she knows that the meeting actually took more or less time than scheduled. Regardless of the edits made, processing can once again proceed to blocks 426 and 428 until such time as the user approves the timecard. By analyzing the data, creating a draft timecard, and arranging the draft timecard on the GUI, the controller can speed up and improve the process.

Using the processing described above, the disclosed system functions as a digital assistant to ascertain as much information as possible for timecard completion based on a given user's calendar and email data. In this manner, the tedium and/or time involved in creating timecards can be decreased. Further, because the timecard creation process can be keyed off of the completion of calendar events, it becomes possible to prompt the user to create relevant timecards closer in time to the actual work having been performed, thereby improving the likelihood that the time will be captured and with greater accuracy as to the nature of the work performed.

Figure 5:
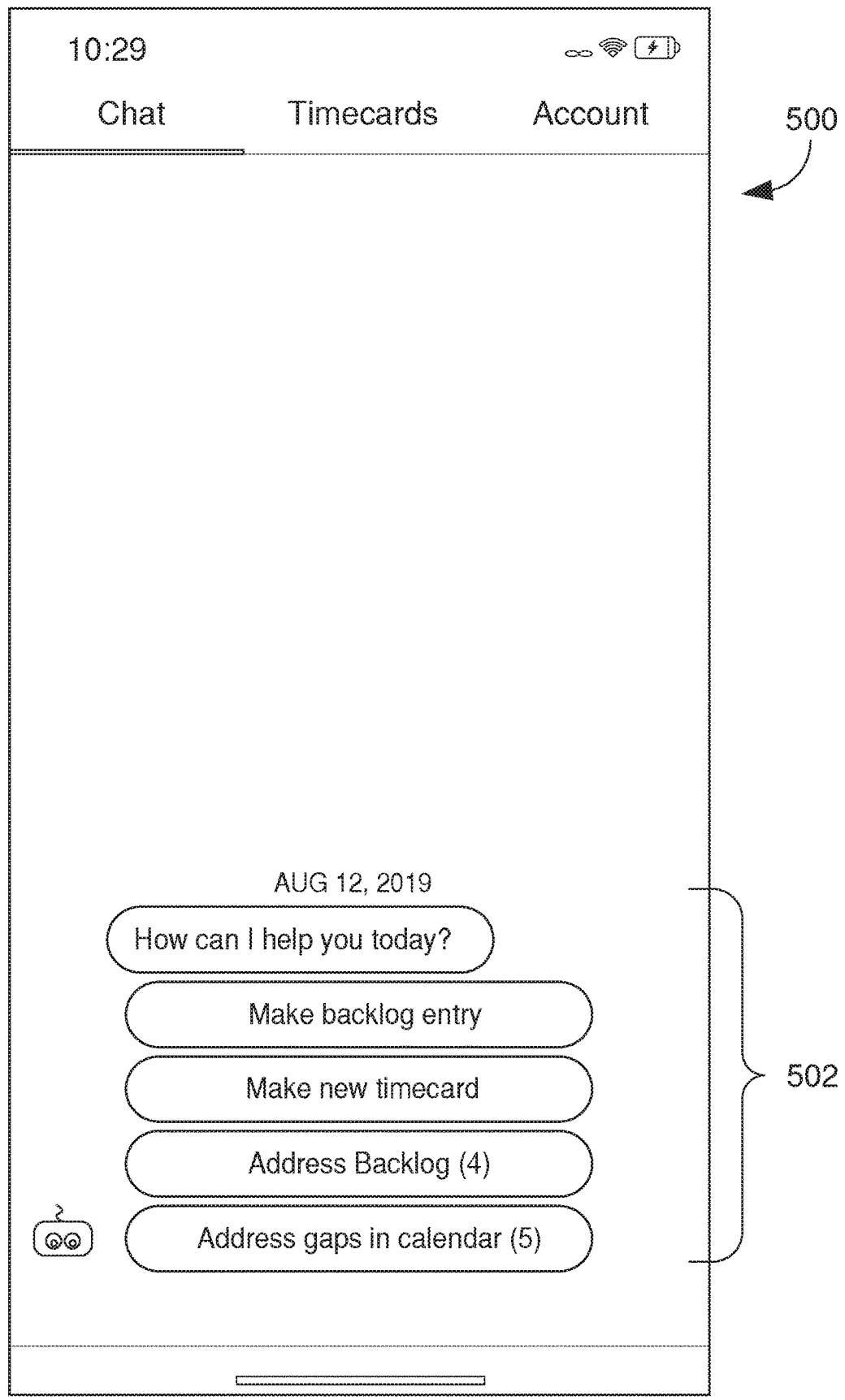
FIGS. 5-9 are screen shots of various example user interface screens in accordance with the embodiment of FIG. 1.
Figure 7:
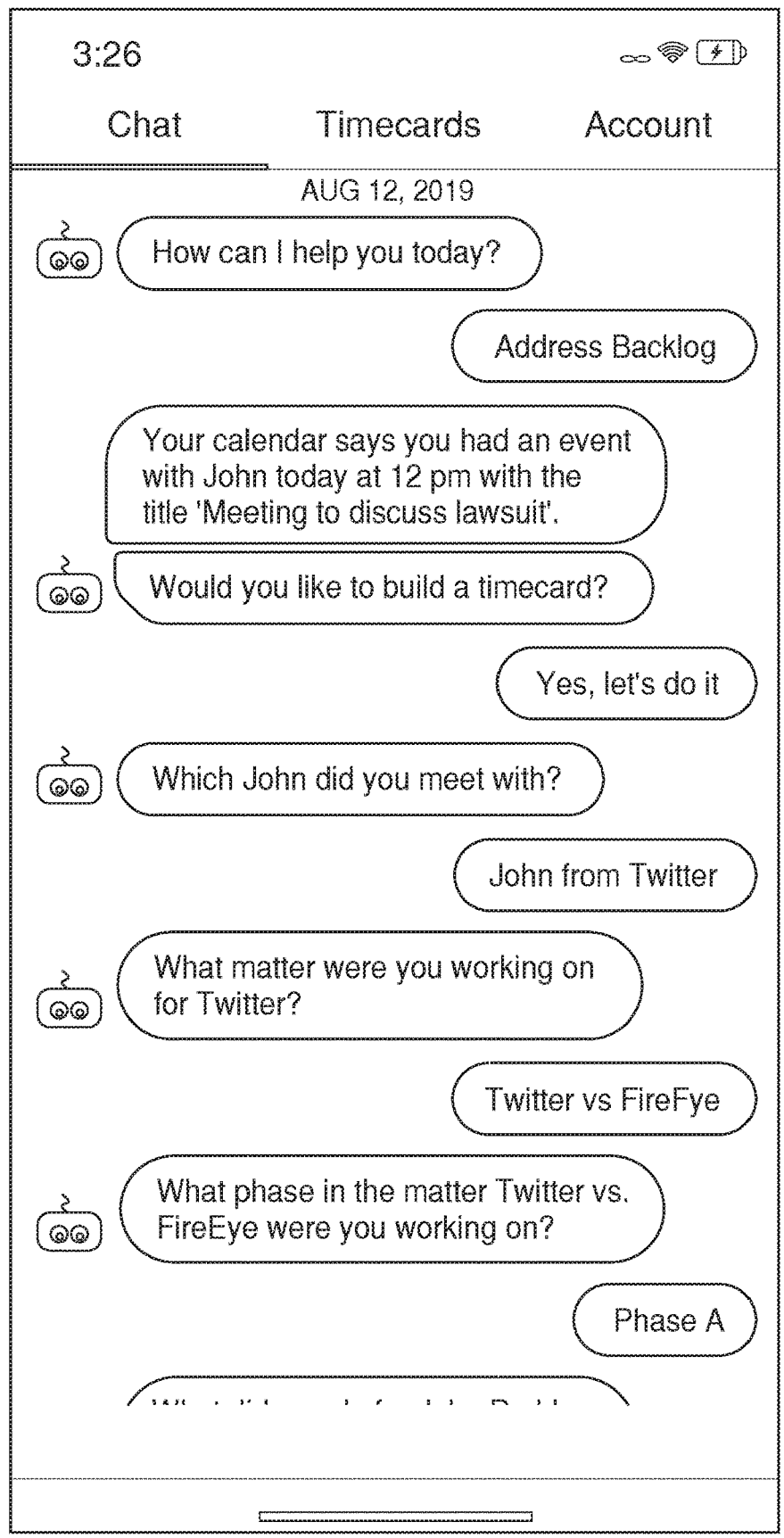
Figure 8:
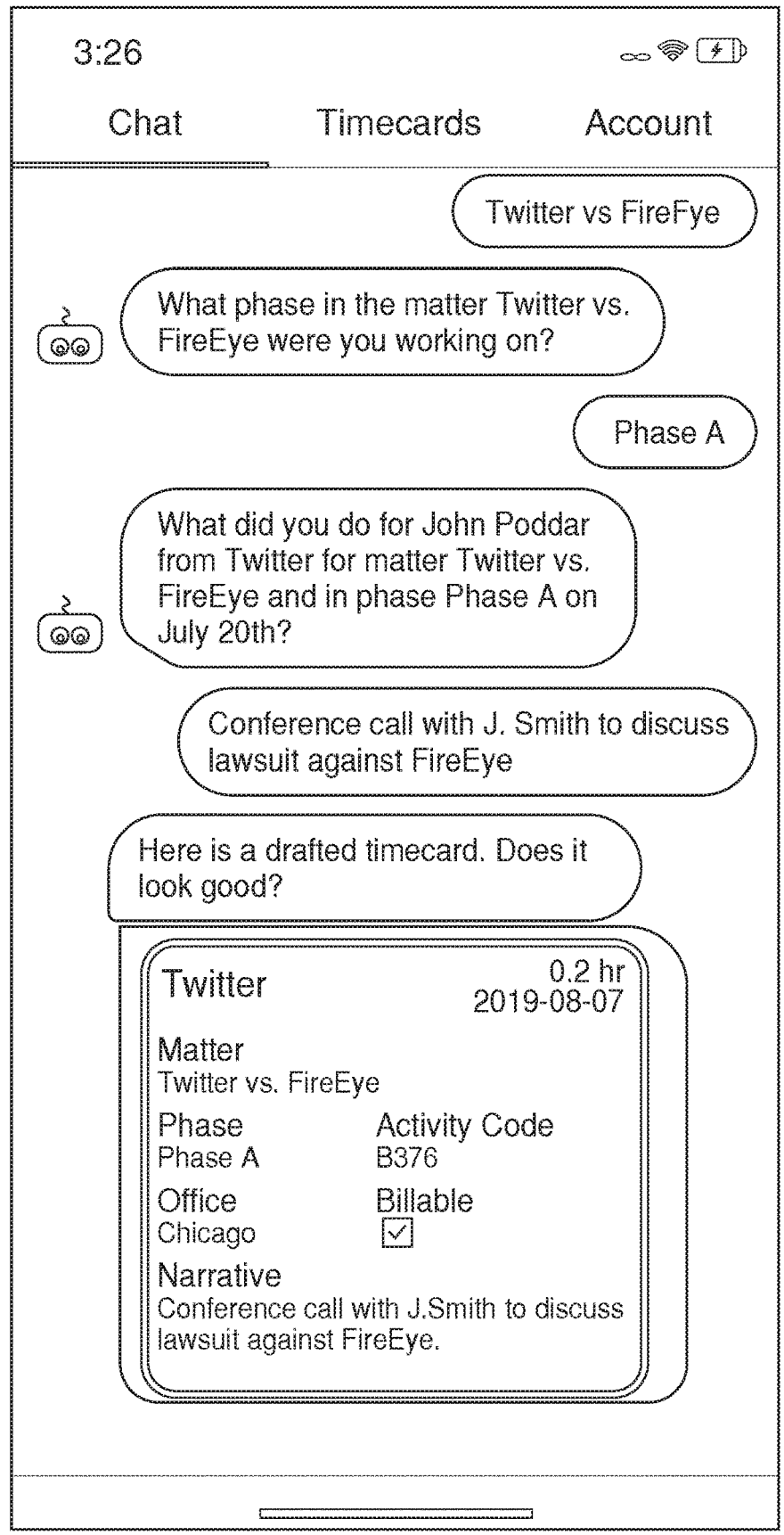
Figure 9:
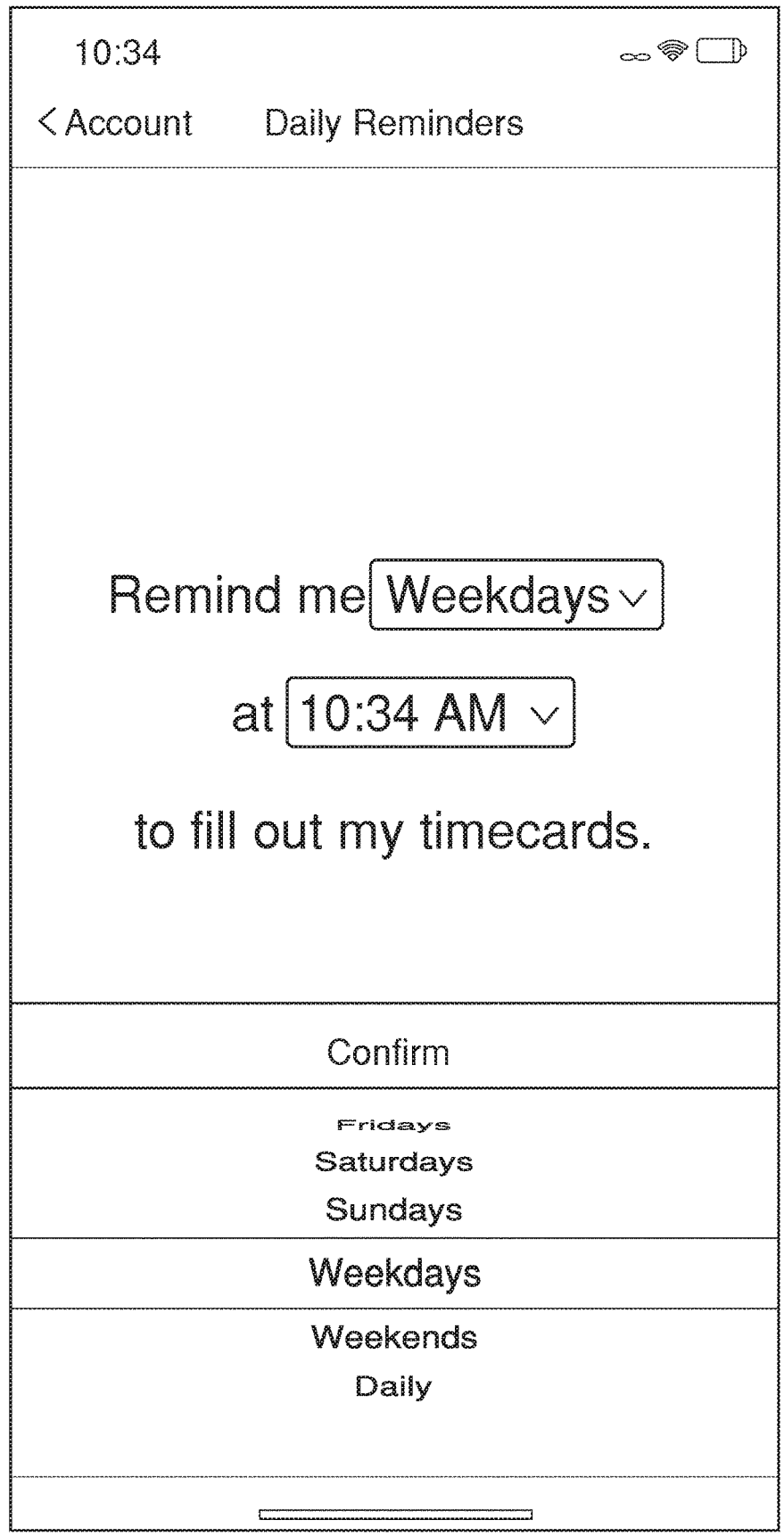

Referring now to FIGS. 5-11, various examples of user interfaces in accordance with the instant disclosure are illustrated. That is, FIGS. 5-11 illustrate several examples of chat screens or ICONs or other images presented on the GUI. In FIG. 5, a user interface in the form of a chat screen 500 of the type often implemented on mobile phones, is illustrated. In this example, a query and potential response dialog 502 is presented to the user in which the user is asked whether he/she would like to address a backlog of calendar events that have not yet been processed for potential time entries. In the processing of FIG. 4, particularly block 402, the opportunity to create a timecard is depicted as occurring shortly after completion of a calendar event. However, this need not always be the case. For example, rather than initiating the timecard creation process immediately after completion of a given event, the system could be configured, for example, to wait until a certain time in the day to solicit the user about any calendar events that have been completed up to that point. An example of a user screen that can be used to configure reminders of this type is shown in FIG. 9, where, in the illustrated example, the user is provided with selection input mechanisms that allow the user to select what days of the week the user would like to be reminded about potential timecards (e.g., "Weekdays" in the illustrated example) and to select what time of day the reminder should be sent (e.g., 10:34 AM in the illustrated example).

Referring back to FIG. 5, the dialog 502 presents four options to a user: "Make new timecard," "Make backlog entry," "Address gaps in calendar" and "Address backlog." The "Make new timecard" option permits a user to initiate a dialog for timecard creation that isn't based on a calendar entry. On the other hand, the "Make Backlog Entry" permits user who are confronted with random billable tasks throughout their day (i.e., not on his/her calendar), and who can not have time to create a new timecard on the spot, to create a backlog entry in the form of a narrative only (i.e., a description of the billable task performed), which is thereafter available to give the user an indication of a billable task that can be turned into a timecard later.

The "Address Gaps in Calendar" option addresses those situations in which a user's calendar has a gap of time larger than a given threshold, e.g., one hour. By recognizing the occurrence of such gaps, the system described herein provides the opportunity for the user to identify a billable task could have otherwise been completed and uncaptured. Thus, when a user selects "Address Gaps in Calendar," the system will simply highlight noted gaps in calendar in an attempts to help the user recall parts of their day without a digital footprint. In one embodiment, if a gap is identified in a calendar and a user makes a backlog entry or new timecard within that gap (thereby decreasing the bisected gap to under the threshold used to identify such gaps) the time interval previously identified as a gap will no longer be identified a gap. For example, the system can identify a gap from 13:00 to 14:00 on a first user's calendar. If the first user creates a backlog entry to create a timestamp at 13:32, the system will no longer treat the interval from 13:00 to 14:00 as a gap. Alternatively, the system can identify a gap from 9:00 to 11:00 on a second user's calendar. If the second user uses the "Create New Timecard" option to create a new timecard for an event that lasted from 9:06 to 9:12, the system will no longer treat the interval from 9:00 to 9:06 as a gap, but will treat the new interval from 9:12 to 11:00 as a gap (based on a one hour gap identification threshold). As yet a further example, the system can identify a gap from 12:00 to 17:00 in a third user's calendar. If the third user makes a backlog entry to create a timestamp at 14:00, the system will treat the interval from 12:00 to 14:00 as a gap and the interval from 14:00 to 17:00 as a gap. Thereafter, if the third user makes a timecard entry for 14:00 to 14:30, the system will continue to treat the interval from 12:00 to 14:00 as a gap and now treats the interval from 14:30 to 17:00 as a gap.

Finally, the "Address backlog" option concerning calendar-based event that can serve as the basis for timecard creation, as described above. In the illustrated example, there are four such unprocessed calendar events.

Figure 6:
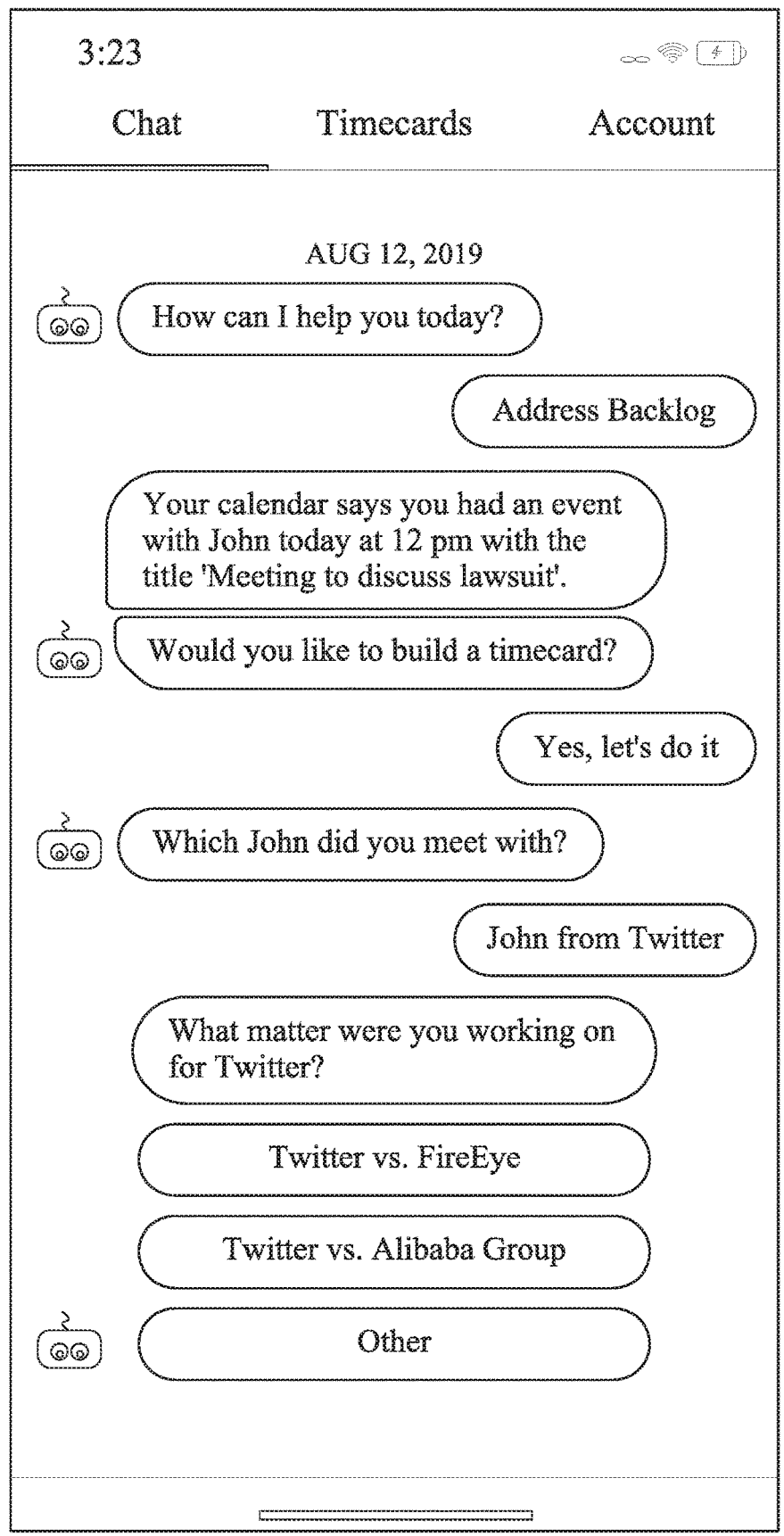

In FIG. 6, an example user interface is illustrated in which the user has selected the "Address backlog" option from FIG. 5. Based on this selection, the dialog presents information about a calendar event, e.g., "Your calendar says you had an event with John today at 12 pm with the title 'Meeting to discuss lawsuit'," along with options to create a timecard, decline to create a timecard (i.e., to ignore this calendar event) or to maintain this calendar event on the backlog. Continuing with this example, the user selects the option to create a timecard based on this calendar event and is thereafter requested to identify the person identified as "John" in the calendar event. In the illustrated example, the user indicates that the person in question is "John from Twitter." By comparing this response with lists of individuals and their employers, the system is able to determine that the client in question for this timecard is "Twitter." Based on this, the system further requests the user to identify a particular matter for Twitter to which the calendar event was relevant, e.g., in the illustrated example, "Twitter vs. FireEye," "Twitter vs. Alibaba Group" or "Other" (whereby the user can be provided with a further listing of relevant matters based on, for example, the frequency and recency with which the user has worked on such matters).

Continuing with this example, as shown in FIG. 7, the user provides a response to the matter inquiry by responding "Twitter vs. FireEye" and, thereafter is requested to identify a particular phase of work for this matter to be associated with this timecard. After identifying the relevant phase ("Phase A"), as shown in FIG. 8, the user is asked to provide a textual description (narrative) of the work performed during the calendar event. Following entry of the narrative, the user is presented with a draft of the timecard, as further shown in FIG. 8, and provided the opportunity to accept the timecard. Alternatively, as described above, it is possible for the user to instead request the opportunity to further edit the timecard before acceptance.

Thus, as described herein, the present invention improves collection and recordation of time entry information and is effective at improving the accuracy of the time entry data based on knowledge about the user's calendar and thereafter engage in a question-and-answer dialog with the user to elicit information necessary to generate a timecard.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A method of time entry on a graphical user interface (GUI) of a computer system, the method comprising:
   receiving information related to an event in a user's calendar;
   determining, by an electronic controller, that the event in the user's calendar has occurred;
   detecting, by the electronic controller, a name from a description of the event in the user's calendar;
   searching, by the electronic controller prior to receiving user input regarding the name from the description, the name from the description of the event in the user's calendar in a contact list stored in a storage device of the computer system;
   generating, by the electronic controller, a subset of a plurality of candidates from the contact list which correspond to the name, the subset of the plurality of candidates having fewer names than the contact list;
   enabling the user to use the GUI to identify one of the plurality of candidates from the subset as a client involved in the event in the user's calendar;
   enabling the user to use the GUI to enter information related to a matter associated with the client;
   generating a draft timecard based on the client identified by the user and the entered information related to the matter associated with the client; and
   displaying the draft timecard on the GUI for approval by the user;
   wherein the GUI includes a chat screen, and
   displaying the draft timecard on the GUI for approval by the user includes displaying the draft timecard on the chat screen.

2. The method of claim 1, further comprising based on the name identified as the client, arranging on the GUI a matter interface to prompt the user to enter information related to the matter associated with the client.

3. The method of claim 2, wherein the matter is one of a plurality of matters, and further comprising arranging on the GUI the matter interface including the plurality of matters for selection of the matter by the user.

4. The method of claim 1, further comprising based on the name identified as the client, determining, via the electronic controller, the matter.

5. The method of claim 1, further comprising arranging on the GUI a time card interface based on the matter.

6. The method of claim 1, further comprising generating, by the electronic controller, a time card interface based on the event.

7. The method of claim 1, comprising determining that the event has occurred using a GPS location.

8. The method of claim 1, wherein enabling the user to identify one of the plurality of candidates includes enabling the user to identify one of the plurality of candidates using the chat screen.

9. The method of claim 1, wherein enabling the user to enter the information includes enabling the user to enter the information using the chat screen.

10. A method of time entry on a graphical user interface (GUI) of a computer system, the method comprising:
    receiving information related to an event in a user's calendar;
    determining, by an electronic controller, whether the event in the user's calendar has occurred;
    detecting, by the electronic controller, a name from a description of the event in the user's calendar;
    searching, by the electronic controller prior to receiving user input regarding the name from the description, the name from the description of the event in the user's calendar in a contact list stored in a storage device of the computer system;
    determining, by the electronic controller, that the event relates to one of a subset of a plurality of names in the contact list stored in the storage device of the computer system;
    arranging on the GUI a names interface to prompt a user to select a name from the subset of the plurality of names, the subset of the plurality of names having fewer names than the contact list;
    based on the name selected, determine, via the electronic controller, a matter associated with the name selected;
    enabling the user to use the GUI to enter information related to the matter associated with the name selected;
    generating a draft timecard based on the matter associated with the name selected and the entered information for the matter associated with the name selected; and
    displaying the draft timecard on the GUI for approval by the user;
    wherein the GUI includes a chat screen, and
    displaying the draft timecard on the GUI for approval by the user includes displaying the draft timecard on the chat screen.

11. The method of claim 10, further comprising based on the name selected, arranging on the GUI a matter interface to prompt the user to enter information related to the matter.

12. The method of claim 11, wherein the matter is one of a plurality of matters, and further comprising arranging on the GUI the matter interface including the plurality of matters for selection of the matter by the user.

13. The method of claim 10, further comprising arranging on the GUI a time card interface based on the matter.

14. The method of claim 10, further comprising generating, by the electronic controller, a time card interface based on the calendar event.

15. The method of claim 10, comprising determining that the event has occurred using a GPS location.

16. The method of claim 10, comprising enabling the user to identify one of the plurality of candidates using the chat screen.

17. The method of claim 10, wherein enabling the user to enter the information includes enabling the user to enter the information using the chat screen.

18. A computer system for time entry, comprising:
    a graphical user interface (GUI) configured to receive information related to an event in a user's calendar; and
    a hardware processor configured to
    determine that the event in the user's calendar has occurred,
    detect a name from a description of the event in the user's calendar;
    prior to receiving user input regarding the name from the description, search the name from the description of the event in the user's calendar in a contact list stored in a storage device of the computer system,
    generate a subset of a plurality of candidates from the contact list which correspond to the name, the subset of the plurality of candidates having fewer names than the contact list,
    enable the user to use the GUI to identify one of the plurality of candidates as a client involved in the event in the user's calendar, enable the user to use the GUI to enter information related to a matter associated with the identified client,
generate a draft timecard based on the client identified by the user and the entered information for the matter associated with the client, and
display the draft timecard on the GUI for approval by the user,
wherein the GUI includes a chat screen, and
the hardware processor is configured to display the draft timecard on the chat screen.

19. The computer system of claim 18, wherein based on the name identified as the client, the hardware processor is configured to arrange on the GUI a matter interface to prompt the user to enter information related to the matter associated with the client.

20. The computer system of claim 19, wherein the matter is one of a plurality of matters, and the hardware processor is configured to arrange on the GUI the matter interface including the plurality of matters for selection of the matter by the user.

21. The computer system of claim 18, wherein based on the name identified as the client, the hardware processor is configured to determine the matter associated with the client.

22. The computer system of claim 18, wherein the hardware processor is configured to arrange on the GUI a time card interface based on the matter.

23. The computer system of claim 18, wherein the hardware processor is configured to generate a time card interface based on the calendar event.

24. The computer system of claim 18, wherein the hardware processor is configured to determine that the event has occurred using a GPS location.

25. The computer system of claim 18, wherein the hardware processor is configured to enable the user to identify one of the plurality of candidates using the chat screen.

26. The computer system of claim 18, wherein the hardware processor is configured to enable the user to enter the information using the chat screen.

* * * * *